(12) United States Patent
Ponti et al.

(10) Patent No.: US 7,643,901 B2
(45) Date of Patent: Jan. 5, 2010

(54) UNIT FOR PREPARING GROUPS OF PRODUCTS IN LAYERS FOR PALLETIZING

(75) Inventors: Alessandro Ponti, Fiorano Modenese (IT); Davide Dall'omo, Bologna (IT); Matteo Pattuelli, Bagnacavallo (IT)

(73) Assignee: Sacmi Packaging S.p.A., Imola (IT)

( * ) Notice: Subject to any disclaimer, the term of this patent is extended or adjusted under 35 U.S.C. 154(b) by 0 days.

(21) Appl. No.: 11/782,332

(22) Filed: Jul. 24, 2007

(65) Prior Publication Data

US 2008/0025834 A1 Jan. 31, 2008

(51) Int. Cl.
*G07F 7/00* (2006.01)

(52) U.S. Cl. ........................ 700/217; 700/230

(58) Field of Classification Search ................ 700/213, 700/217, 230, 228; 414/794.2, 791.6, 792.6, 414/792; 198/468.6, 614
See application file for complete search history.

(56) References Cited

U.S. PATENT DOCUMENTS

| | | | | |
|---|---|---|---|---|
| 3,827,577 | A * | 8/1974 | Kurk et al. | 414/790 |
| 4,024,965 | A * | 5/1977 | Marth et al. | 414/789.1 |
| 4,633,581 | A * | 1/1987 | Villanueva | 29/822 |
| 5,437,534 | A * | 8/1995 | Gales | 414/789.9 |
| 5,489,016 | A * | 2/1996 | Welch | 198/347.2 |
| 5,533,861 | A * | 7/1996 | Klupfel | 414/794.2 |
| 5,716,189 | A * | 2/1998 | Winski et al. | 414/800 |
| 6,658,816 | B1 * | 12/2003 | Parker et al. | 53/397 |
| 2005/0166552 | A1 | 8/2005 | Omo et al. | |
| 2005/0246056 | A1 | 11/2005 | Marks et al. | |
| 2007/0272515 | A1 * | 11/2007 | Yohe et al. | 198/443 |

FOREIGN PATENT DOCUMENTS

| | | |
|---|---|---|
| DE | 27 23 012 A1 | 11/1978 |
| EP | 1 550 610 A1 | 7/2005 |
| EP | 1 669 309 A1 | 6/2006 |

* cited by examiner

*Primary Examiner*—Gene Crawford
*Assistant Examiner*—Ramya Prakasam
(74) *Attorney, Agent, or Firm*—Pearne & Gordon LLP

(57) ABSTRACT

A unit for preparing groups (1) of products in layers (S) for palletizing comprises: a motor-driven element (4) for controlled pick up and release of the groups (1) of products from the first surface (3) to a second surface (5), positioned by the side of the first surface (3), for preparing a layer (S) of groups (1) of products; a logic unit (7) for controlling and programming the pick up and release element (4) and the second surface (5) to obtain individual layers (S) made up of two or more groups (1) of products on the second surface (5) by moving them along or around axes, transversal (Y) to the extension of the first surface (3), parallel (X) with the extension of the first surface (3), at a vertical height (Z) and according to an angle (α) of rotation about the vertical axis (Z); the pick up and release element (4) having independent drive units (9, 10, 11) designed to control the element (4) according to three of the controlled axes (X, Y, Z, α); the second preparation surface (5) having a drive unit (12) for controlling the second surface (5) along the remaining controlled axis (X, Y, Z, α) to place the groups (1) of products so as to form the layer (S), with an interface unit (13) inserted between the logic unit (7) and the element (4) and second surface (5), allowing the four axes (X, Y, Z, α) to be coordinated in such a way as to form the layer (S).

8 Claims, 8 Drawing Sheets

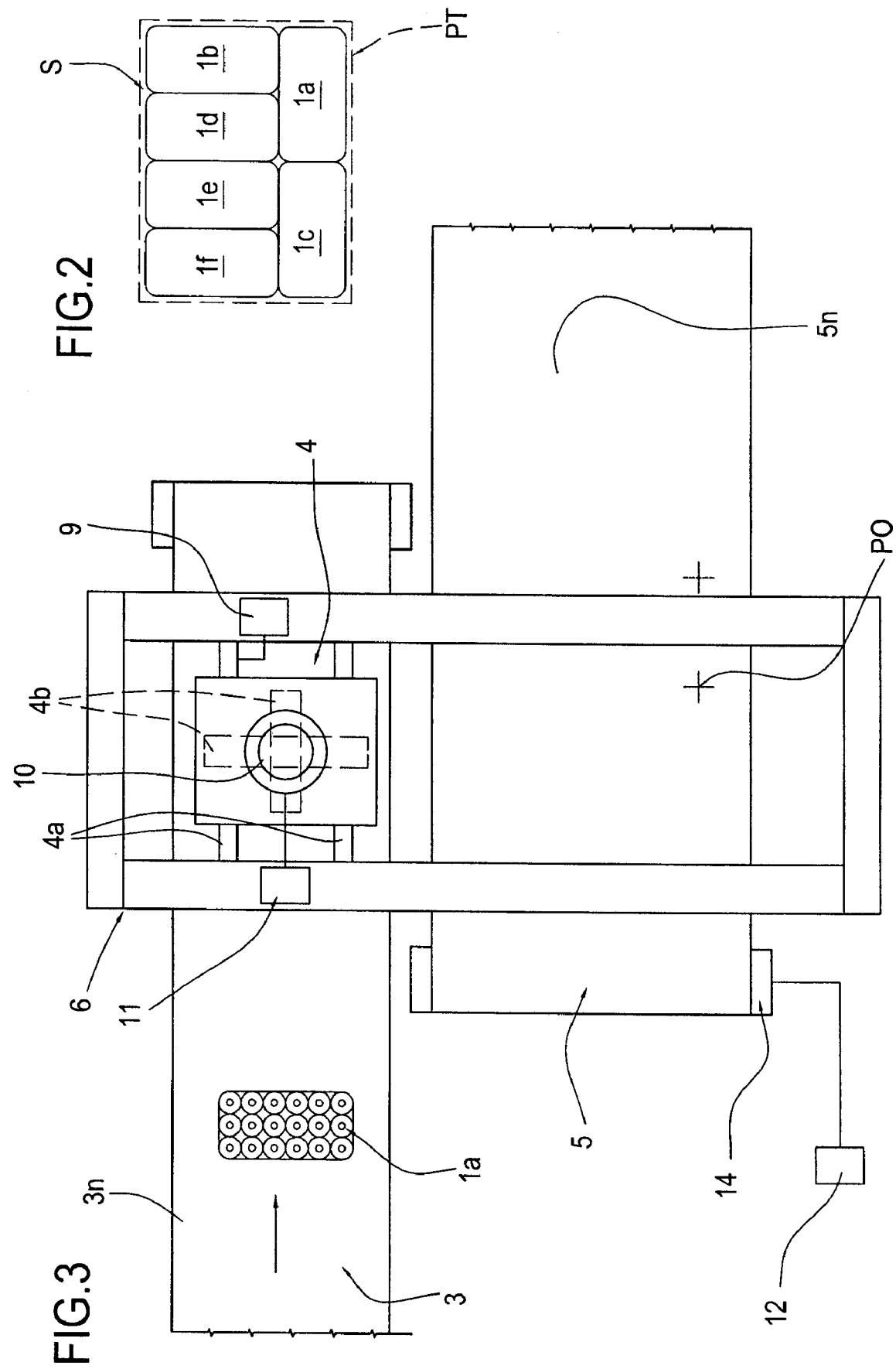

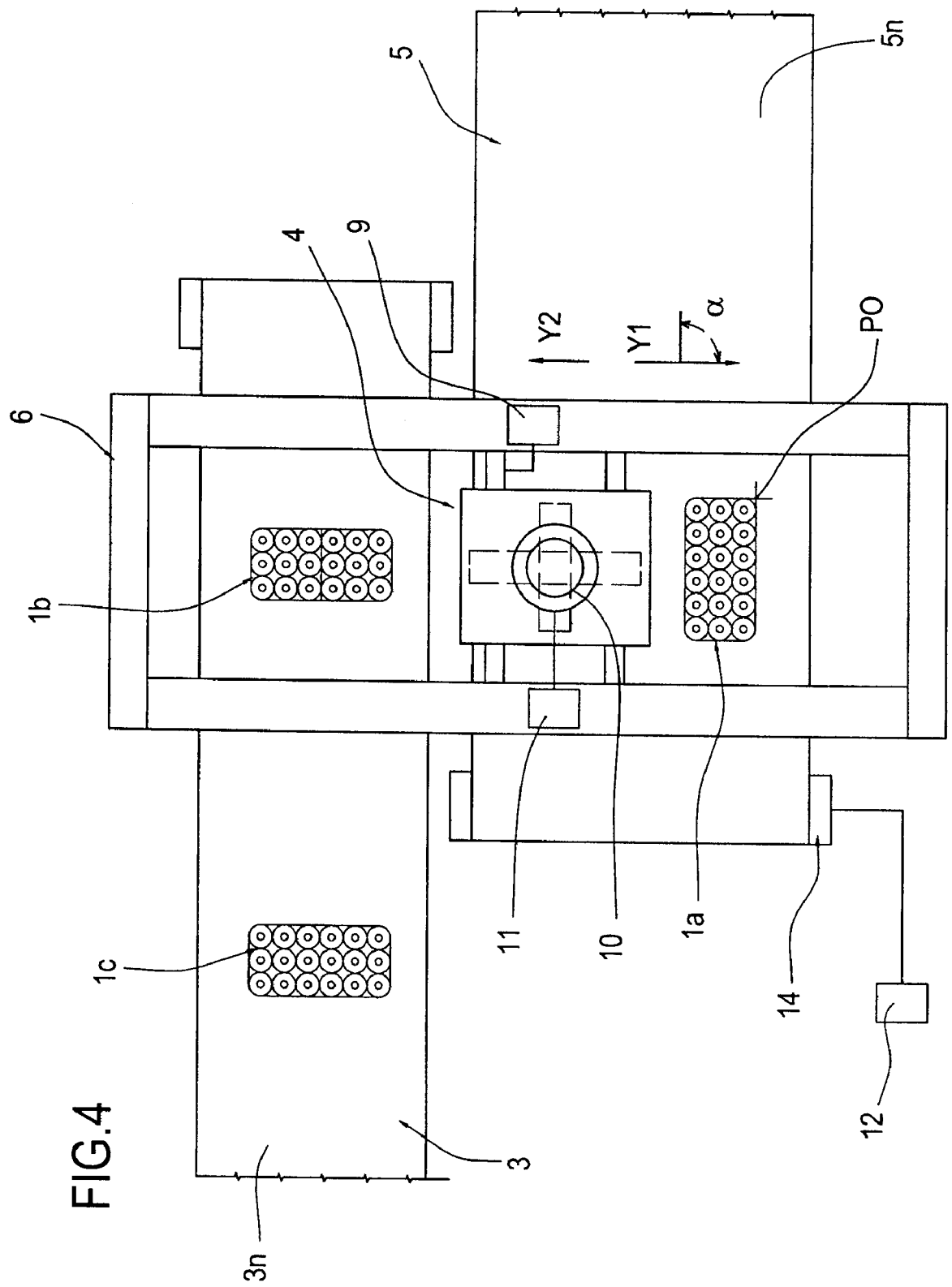

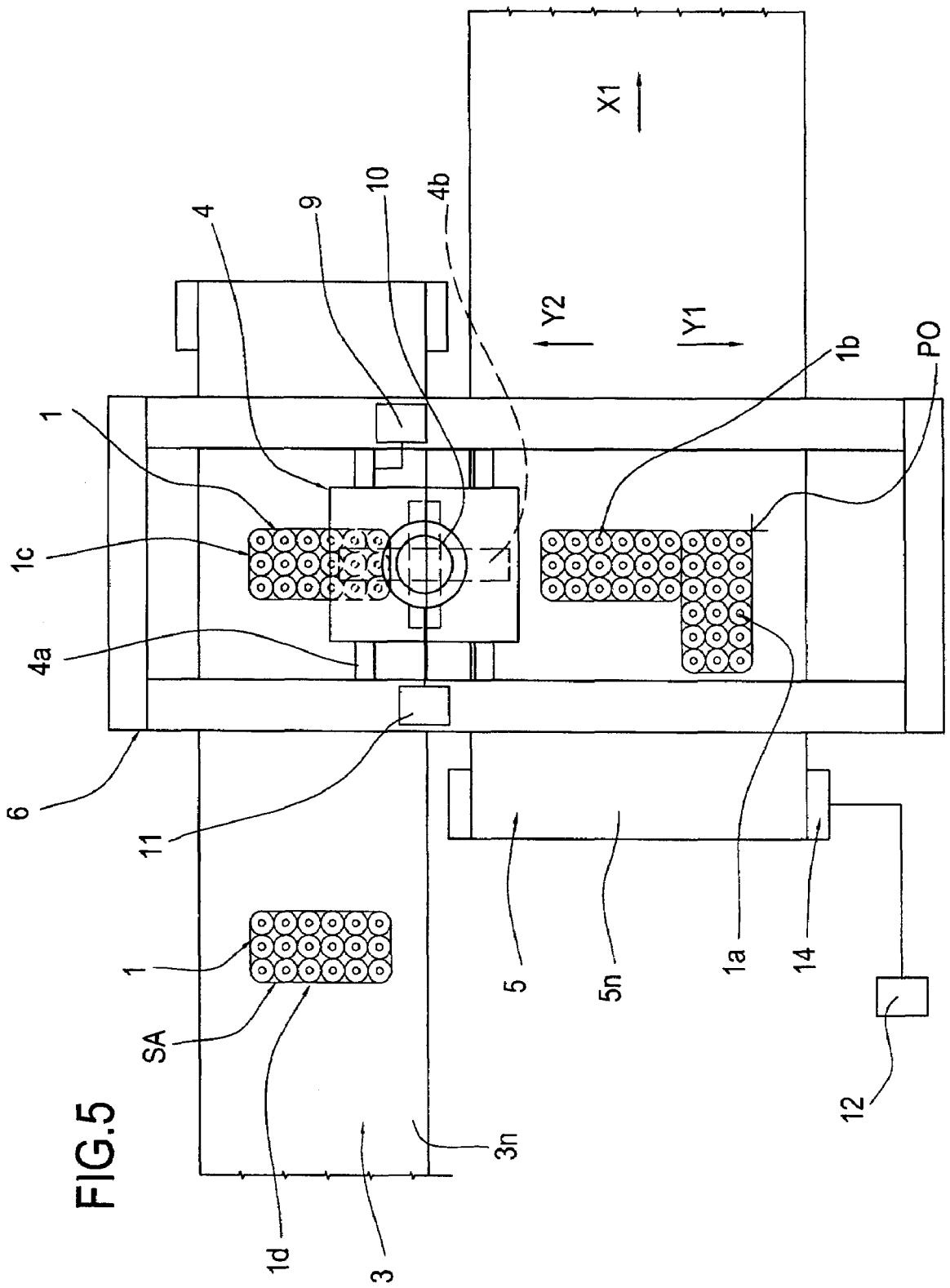

UNIT FOR PREPARING GROUPS OF PRODUCTS IN LAYERS FOR PALLETIZING

BACKGROUND OF THE INVENTION

The present invention relates to a unit for preparing groups of products in layers for palletizing, in particular, but without limiting the scope of the invention, groups of roll products for bathroom and/or household use.

It is well known that downstream of machines which produce packs of roll products, in various configurations to form loose groups or groups which are grouped together and overwrapped to form bags, there are palletizing islands for the loose groups or bags.

The palletizing island is fed by a belt connecting it to the production machines. The belt feeds batches of loose products or bags (obtained from a bagging unit upstream of the palletizing island) one after the other.

The groups or bags are positioned in a first substation of the palletizing island, from where a suitable first unit forms a layer consisting of a predetermined number of groups of products or bags, according to parameters preset by the logic system which controls the palletizing island.

The layer formed in this way is usually fed until it is close to a second substation having a second logic unit (a robotic unit) with movable grippers for picking up the entire layer of products prepared and moving it to a pallet positioned at a predetermined point of the palletizing island.

The pallet complete with two or more stacked layers of bags or groups of loose products is sent to warehouses (which may or may not belong to the manufacturer) which subsequently ship the pallets.

As already indicated, the palletizing island has a microprocessor control system designed to program and optimize the product layering geometry according to the data entered, that is to say, the type of product to be layered (bag or loose batch and relative dimensions) and the dimensions of the pallet to be used.

With suitable algorithms or direct commands from the operator, the system allows programming of the optimum arrangement of the products on the receiving surface to form the layer (and subsequent layers, which may differ from one another in terms of the relative arrangement of the groups of products) and in such a way as to optimize the movements of the robotic product pick and place unit.

Therefore, once programmed, said system controls the movement of the two robotic units operating in the palletizing island.

At present, three different types of units may be used for layering.

The first has a series of infeed channels for the groups or bags of products arriving and a plurality of stops, "blockers", devices for checking movement and pushers acting on them, which can be switched on and off on a relative layer preparation surface or belt.

These elements are moved according to a series of sequences programmed by the control logic unit so as to arrange the groups or bags according to a predetermined pattern to form the layer.

The second type of layering unit is provided directly by the above mentioned robotic unit which immediately picks up the products arriving from the first belt and creates the layer directly on the pallet. Said solution is possible if the machines upstream of the palletizing island have low production rates.

The third type of solution (of particular interest in this text) consists of a robotic device with Cartesian axes (also known as a "pick and place" unit to experts in the field), comprising a gantry frame positioned over the first feed belt and a second belt, parallel with the first, on which the products are placed to form the layer, which is then fed towards the second robotic unit for palletizing.

The frame has a set of elevated guides to allow an element for picking up/releasing the groups or bags to move according to four axes (parallel with the belts—X—, transversal to the belts—Y—, vertical—Z—and at an angle—α—for product rotation) driven by relative drive units.

Therefore, the pick up/release element is controlled by the logic unit and, depending on layer forming parameters, moves between the first belt, to pick up the products, and the second belt to release the products in a predetermined position and according to a cyclical sequence with movement along and around the four axes.

The latter solution, widely used to prepare layers of products, allows good product layering in the unit of time, but has a rather heavy and relatively expensive structure, since it needs two crossed guides able to move with the pick up and release element, vertical guides, and a system for rotation of said element to perform all of the movements necessary.

In addition to this, a drive unit is required for each type of axial movement, associated with the pick up and release element and able to move with it, together with the kinematic connecting systems.

SUMMARY OF THE INVENTION

This invention therefore has for an aim to overcome the above mentioned disadvantage by providing a unit for preparing groups of products in layers for palletizing, in particular, but without limiting the scope of the invention, groups of roll products for bathroom and/or household use, with more simple construction and a higher production rate in the unit of time, by optimizing use of the elements already present in the palletizing island and at the same time improving the layering unit components, so that they are less expensive and architecturally better.

Accordingly, this aim is achieved by a unit for preparing groups of products in layers for palletizing, in particular a unit for preparing groups of roll products in layers for palletizing, with the technical features described in one or more of the claims herein.

BRIEF DESCRIPTION OF THE DRAWINGS

The technical features of the invention, with reference to the above aims, are clearly described in the claims below and its advantages are more apparent from the detailed description which follows, with reference to the accompanying drawings which illustrate a preferred embodiment of the invention provided merely by way of example without restricting the scope of the inventive concept, and in which:

FIG. 2 is a schematic plan view of a layering pattern for the groups of products which can be implemented by the unit of FIG. 1;

FIGS. 3 to 9 are schematic top plan views of a succession of steps for forming the layer configured as shown in the diagram of FIG. 2, which can be carried out by the unit of FIG. 1.

DESCRIPTION OF THE PREFERRED EMBODIMENTS

Figure 1:
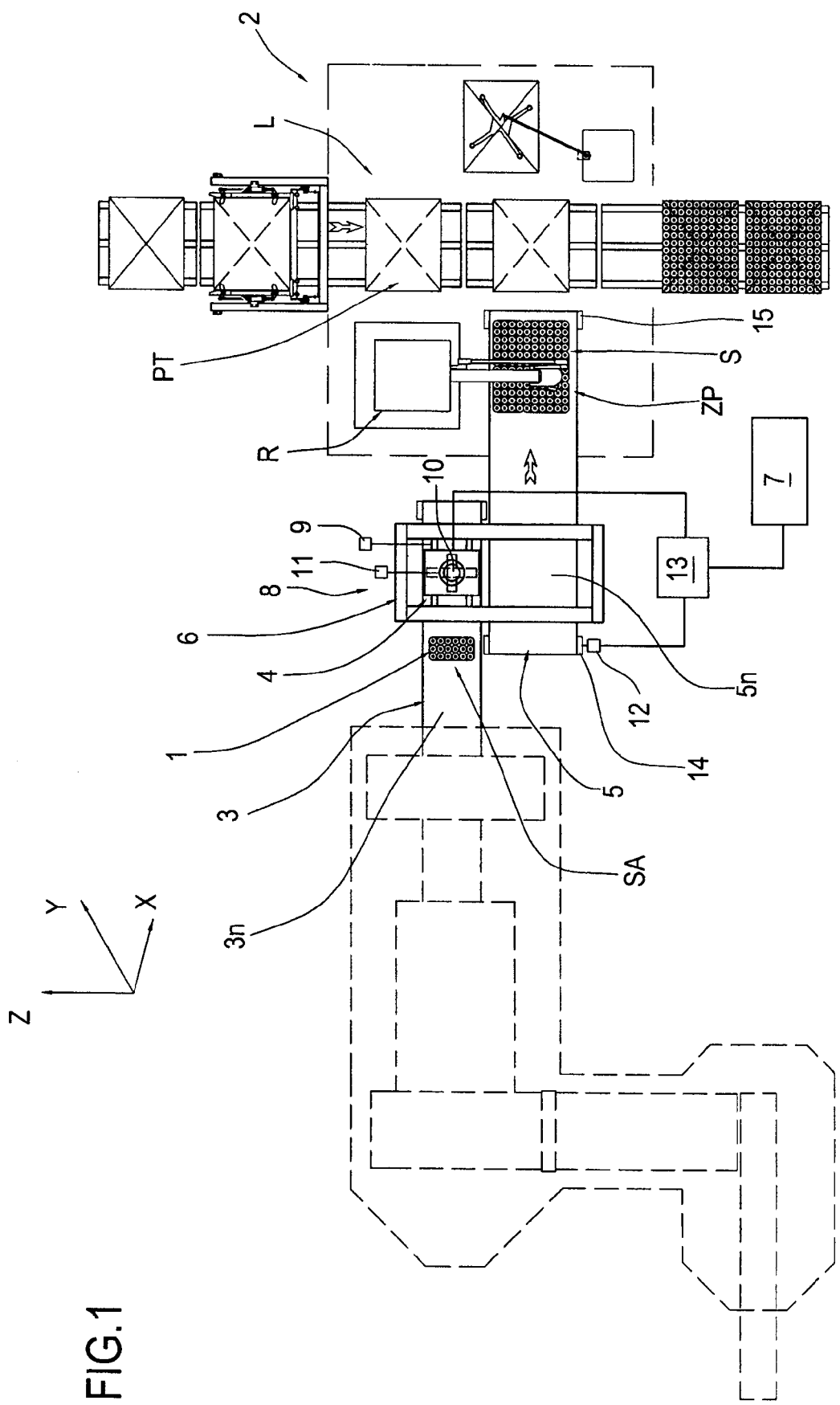
FIG. 1 is a schematic plan view of a unit for preparing groups of products in layers for palletizing, in particular, groups of roll products for bathroom and/or household use, inserted in a palletizing island, in accordance with the present invention.

With reference to the accompanying drawings, and in particular FIG. 1, the unit 8 according to the invention is used to prepare layers S of groups 1 of products, in particular roll products for household and/or bathroom use, for palletizing on pallets PT.

In particular, these groups 1 of products may each consist of a plurality of products, grouped together to form a configuration, and wrapped and closed in a sheet of wrapping film. They may also be grouped together in two or more groups 1 and wrapped with a sheet of overwrapping film to form a bag SA (as illustrated in the accompanying drawings).

Again as illustrated in FIG. 1, the unit 8 is included in a palletizing island 2 for the groups 1 of products fed by a first movable surface 3.

In addition to the unit 8, the palletizing island 2 comprises a robotized unit R for picking up the entire layer S formed by the unit 8 and placing it on a pallet PT fed by a relative line L.

In particular, the unit 8 comprises:

a motor-driven element 4 for controlled pick up and release of the groups 1 of products from the first surface 3 to a second surface 5, positioned at the side of the first surface 3, for preparing a layer S of groups 1 of products and sending the layer S to the robotized unit R;

a supporting frame 6 positioned over the two surfaces 3 and 5 and on which the motor-driven pick up and release element 4 moves;

a microprocessor logic unit 7 for controlling and programming both the pick up and release element 4 and the second surface 5, to obtain the individual layers S (which may even differ from one another for the same pallet PT) of groups 1 of products on the second surface 5 according to their size and the size of the pallet PT, and by moving the groups 1 of products along or around the axes, respectively, transversal Y to the extension of the first surface 3, parallel X with the extension of the first surface 3, at a vertical height Z relative to the two surfaces 3 and 5 and according to an angle α of rotation about the vertical axis Z (the relative movements are indicated by the arrows in the accompanying drawings).

As FIG. 1 clearly shows, the second surface 5 is parallel with the first surface 3 and consists of a second, endless belt 5n trained around a pair of pulleys 14 and 15.

Similarly, the first surface 3 may also consist of an endless belt 3n trained around pulleys.

The pick up element 4 is of the type also known as a "pick and place" unit, that is to say, consisting of sliding supports 4a on the gantry frame 6 and movable arms 4b for picking up and releasing the groups 1 of products.

As FIGS. 3 to 9 clearly show, the pick up and release element 4 has independent drive units 9, 10 and 11 designed to control the element 4 on three of the controlled axes X, Y, Z, α.

The fourth axis is controlled directly by the second preparation surface 5 by means of a drive unit 12 for placing the groups 1 of products to form the layer S, at least as regards said axis.

In addition, there is an interface unit 13 inserted between the logic unit 7 and the pick up and release element 4 and the second surface 5, again controlled by the logic unit 7, and designed to allow the four axes X, Y, Z, α to be coordinated in such a way as to form the layer S according to the logic unit 7 layer S programming parameters P.

More precisely, the drive unit 12 of the second belt 5n is connected to and acts at/on one of the pulleys 14 and 15 so as to move the second belt 5n in both directions along the axis X parallel with the extension of the two surfaces 3 and 5 depending on the position the groups 1 of products must assume.

Consequently, the pick up and release element 4 has three drive units 9, 10 and 11 designed to move the pick up and release element 4, respectively, along the transversal axis Y, along the vertical axis Z and according to the angle α of rotation about the vertical axis Z.

Obviously, the second surface 5 drive unit 12 also drives a second surface 5 stroke designed to allow the layer S formed to be expelled towards a zone ZP where it is picked up for palletizing, that is to say, in the robotized unit R operating zone.

The interface unit is an electronic unit 13 (illustrated with a block) for controlling the four drive units 9, 10, 11 and 12, for example brushless motors, designed to coordinate the movement of the pick up and release element 4 and the second surface 5 according to the four controlled axes X, Y, Z, α.

Advantageously, during placing, the interface unit 13 checks and adjusts, the second surface 5 along the parallel axis X when the pick up and release element 4 performs its return stroke towards the first surface 3, that is to say, during "masked time".

For a better understanding of the structure and operation of the unit 8 just described, FIG. 2 shows a theoretical configuration of groups of products, labeled individually 1a, 1b, 1c, 1d, 1e and 1f, programmed by the logic unit 7 according to the parameters P of the size of the individual group of products and the perimeter size of the pallet PT (illustrated with a dashed line in FIG. 2).

Figure 6:
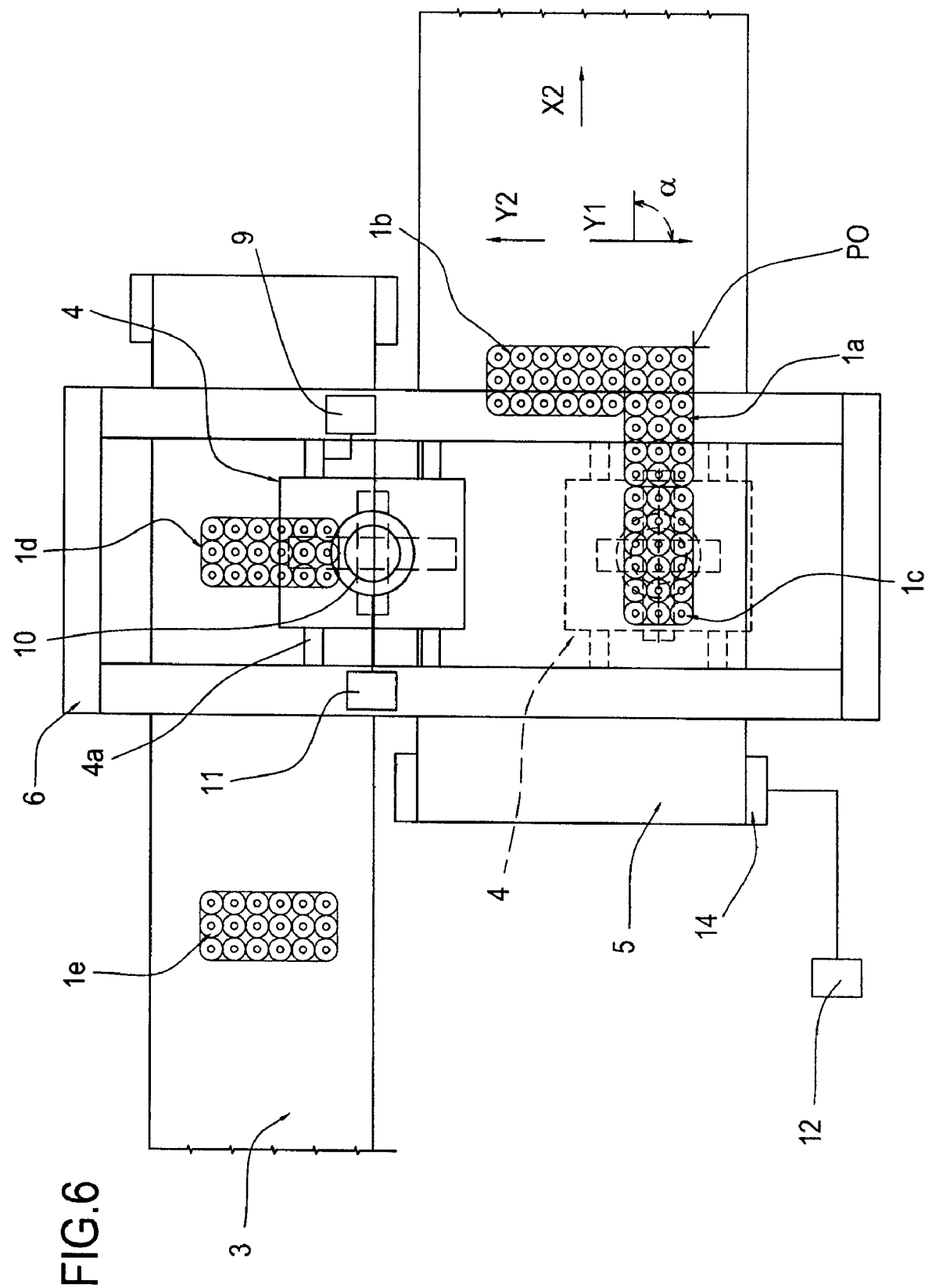
Figure 7:
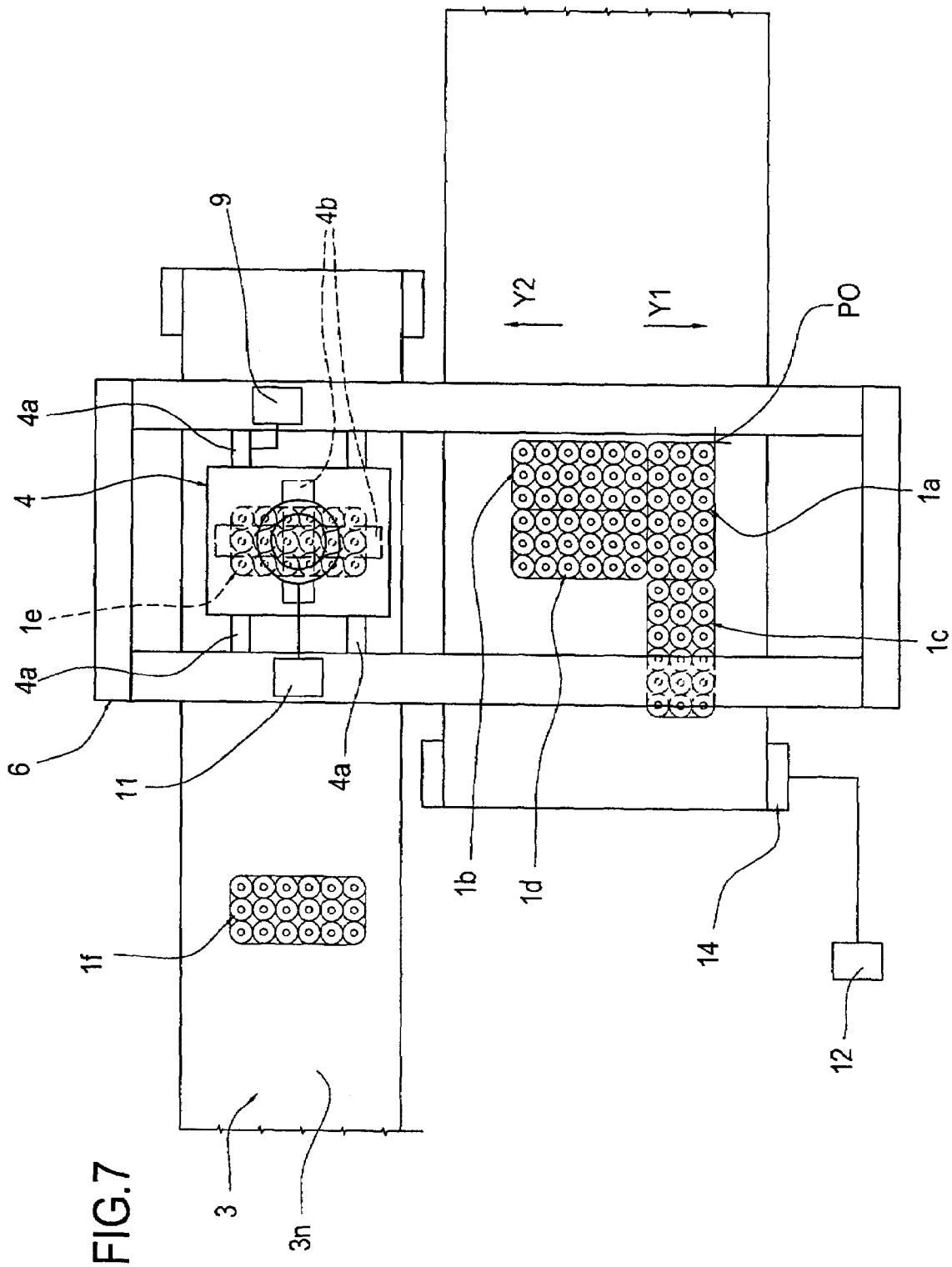
Figure 8:
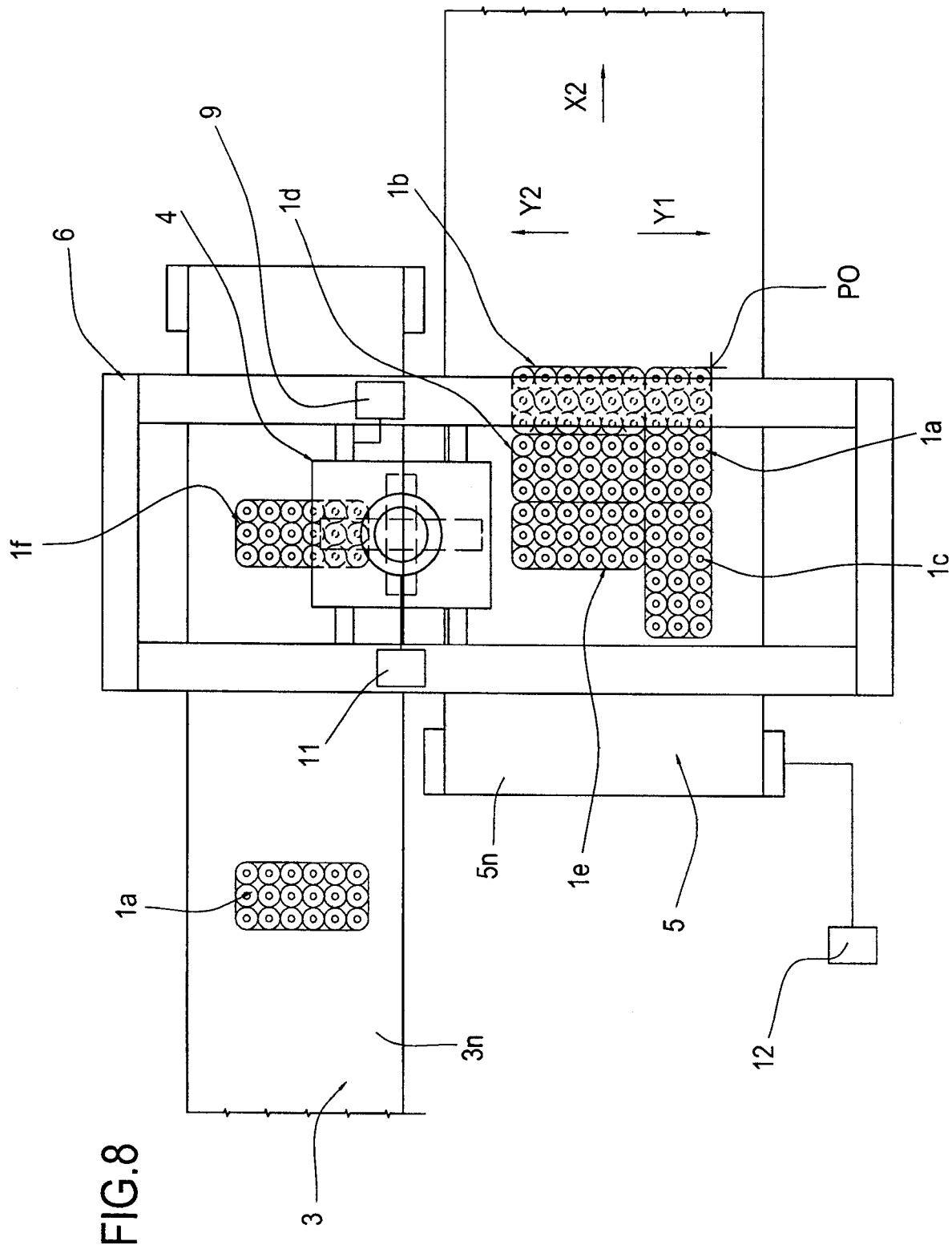
Figure 9:
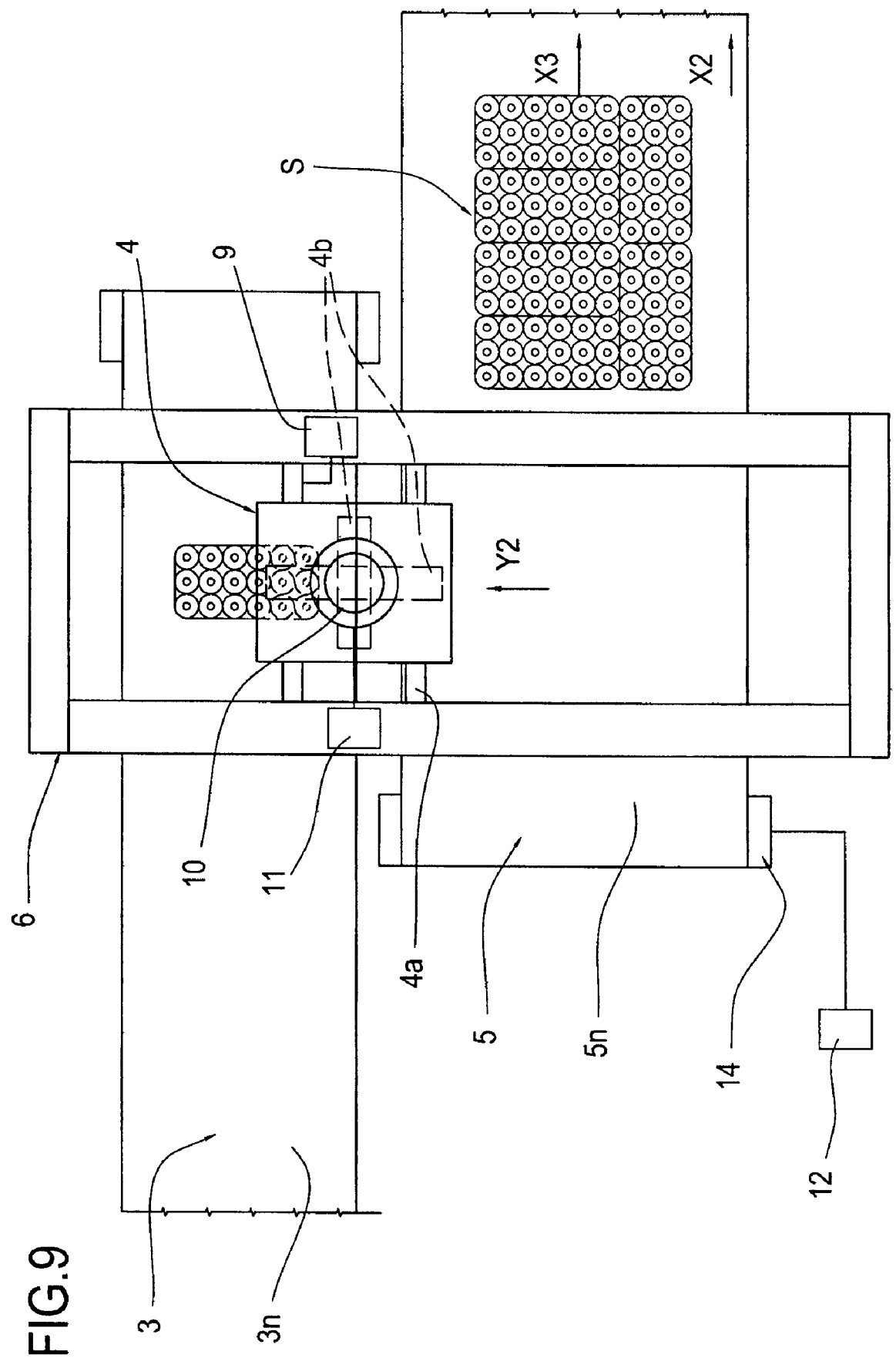

After confirming the configuration of the layer S, the logic unit 7 selects a point P0 on the second belt 5n to set a theoretical pallet PT corner and activates the interface unit 13 which, in turn, controls the element 4 and the second belt 5n, in the following sequence:

pick up (with lifting along the axis Z) of the group 1a of products by the element 4, with simultaneous movement of the second belt 5n in direction X1 to intercept the direction Y1 of the element 4 arriving, after picking up the group 1a, at the point P0 (see FIG. 3);

rotation and release of the group 1a by the element 4 in the position assumed by the belt 5n and return in trajectory Y2 towards the first surface 3 (see FIG. 4);

belt 5n adjustment in trajectory X1 to cross the trajectory Y1 of the element 4 which, in the meantime, is travelling along the trajectory Y2 to go and pick up the group 1b followed by placing of said group 1b after the trajectory Y1 stroke (see FIG. 5);

belt 5n adjustment in trajectory X2 (again with reference to point P0) to cross the trajectory Y1 of the element 4 which, in the meantime, is travelling along the trajectory Y2 to go and pick up the group 1c followed by placing (with rotation) of said group 1c after the trajectory Y1 stroke (see FIG. 6);

a further belt 5n adjustment in trajectory X1 to allow crossing of the trajectory Y1 of the element 4 which, in the meantime, is travelling along the trajectory Y2 to go and pick up the group 1d followed by placing of said group 1a after the trajectory Y1 stroke (see FIG. 7);

the final two belt 5n adjustments in successive trajectories X2 again crossing the trajectory Y1 of the element 4 which, in the meantime, is travelling along the trajectory Y2 to go and pick up, one after another, the groups 1e and 1f followed by placing of said final two groups 1e and 1f after the relative trajectory Y1 strokes (see FIGS. 8 and 9);

when the layer S has been made up, the second belt 5n drive unit 12 causes it to perform a stroke X3 to carry the layer 5n to the pick up zone ZP (again see arrow X3 in FIG. 9).

Therefore, a unit structured in this way achieves the preset aims thanks to the possibility of dividing up the adjustments of the operating axes for placing the groups of products between the pick up and release element and the layer preparation surface.

Said division, as well as not radically changing the architecture of the unit, allows the structure of the pick up and release element to be made lighter with advantages in terms of the operating speed of the element and therefore of the entire layer preparation operation.

In addition, the adjustment along the axis X of the layer preparation surface simplifies the unit control logic operations and, above all, the trajectories of the pick up and release element are optimized.

The operating speed is further increased by the fact that the adjustment on the axis X of the second surface is carried out during the pick up and release element return stroke, that is to say, in a "masked time".

The invention described above is susceptible of industrial application and may be modified and adapted in several ways without thereby departing from the scope of the inventive concept. Moreover, all the details of the invention may be substituted by technically equivalent elements.

What is claimed is:

1. A unit for preparing groups of products in layers for palletizing comprising:
   a motor-driven pick up and release element for controlling the pick up and the release of groups of products from a first surface to a second surface, said second surface being positioned adjacent the first surface, said second surface being movable forwards and backwards along a first axis X;
   a supporting frame for the motor-driven pick up and release element positioned over the two surfaces;
   said motor-driven pick up and release element having (a) a first drive unit for controlling movement of the pick up and release element forwards and backwards along a second axis Y perpendicular to said first axis X, and (b) a second drive unit for controlling movement of the pick up and release element up and down along a third axis Z perpendicular to said first axis X and perpendicular to said second axis Y, said pick up and release element being rotatable via a drive unit about said third axis Z, said pick up and release element being movable only (a) along said second axis Y, (b) along said third axis Z, and (c) rotatably about said third axis Z;
   said second surface comprising a respective drive unit for controlling the movement of the second surface along said first axis X;
   a microprocessor logic unit for controlling and programming the movement of the pick up and release element and of the second surface, said motor-driven pick up and release element and said second surface being movable for forming individual layers of two or more groups of products on the second surface according to the size of a pallet;
   an interface unit inserted between the logic unit, the pick up and release element and the second surface, controlled by the logic unit, and designed to allow the axes of motion of the pick up and release element and the axis of motion of the second surface to be coordinated in such a way as to form the layer according to the logic unit layer programming parameters.

2. The unit according to claim 1, wherein the second surface is parallel with the first surface and consists of an endless belt trained around a pair of pulleys, said endless belt being movable by a drive unit forward and backward along said first axis X.

3. The unit according to claim 1, wherein the drive units of the pick up and release element are independent of each other.

4. The unit according to claim 1, wherein the interface unit is an electronic unit for controlling the drive units, the drive units being of the brushless motor type, the interface unit being designed to coordinate the movement of the pick up and release element and the second surface.

5. The unit according to claim 1, wherein, during placing, the interface unit checks and adjusts the second surface along its axis of motion when the pick up and release element performs a return stroke towards the first surface.

6. A unit for preparing groups of products in layers for palletizing comprising:
   a first belt for transporting a plurality of grouped products and a second belt for transporting an ordered layer of the grouped products towards a palletizing zone;
   a motor-driven pick up and release element, positioned adjacent said two belts, for transferring said plurality of grouped products from said first belt to said second belt;
   a drive unit for moving said second belt forwards and backwards along an horizontal axis X, a drive unit for moving said pick up and release element along a vertical axis Z perpendicular to said horizontal axis X, and a drive unit for moving said pick up and release element along a transverse axis Y perpendicular to said horizontal axis X and said vertical axis Z, said pick up and release element being rotatable via a drive unit about said vertical axis Z, said pick up and release element being movable only (a) along said transverse axis Y, (b) along said vertical axis Z, and (c) rotatably about said vertical axis Z;
   a microprocessor logic unit connected to the drive units for controlling and coordinating the movement of the pick up and release element and the second belt in order to dispose said plurality of grouped products picked up from the first belt in an ordered layer on said second belt.

7. The unit according to claim 6, wherein said first belt is movable along an axis substantially parallel to said horizontal axis X.

8. The unit according to claim 6, wherein said logic unit can control and program the movement of the pick up and release element and of the second belt so that the second belt can transport said ordered layer towards the palletizing zone while the pick up and release element returns towards the first belt.

* * * * *

UNITED STATES PATENT AND TRADEMARK OFFICE
CERTIFICATE OF CORRECTION

PATENT NO. : 7,643,901 B2 Page 1 of 1
APPLICATION NO. : 11/782332
DATED : January 5, 2010
INVENTOR(S) : Alessandro Ponti et al.

It is certified that error appears in the above-identified patent and that said Letters Patent is hereby corrected as shown below:

On the Title page of the patent, after line (65) entitled "Prior Publication Data", please insert the Foreign Priority Data as follows.

-- Foreign Application Priority Data
July 26, 2006   (IT)   BO2006A000560 --

Signed and Sealed this

Twenty-third Day of March, 2010

David J. Kappos
*Director of the United States Patent and Trademark Office*